United States Patent

[11] 3,599,335

| [72] | Inventor | George E. MacVeigh |
| | | Bethesda, Md. |
| [21] | Appl. No. | 831,118 |
| [22] | Filed | June 6, 1969 |
| [45] | Patented | Aug. 17, 1971 |
| [73] | Assignee | The United States of America as represented by the Administrator of the National Aeronautics and Space Administration |

[54] ANALOG SPATIAL MANEUVER COMPUTER
12 Claims, 6 Drawing Figs.

[52] U.S. Cl. .................................................. 33/15 A,
33/204 C, 235/61 NV
[51] Int. Cl. ..................................................... G01b 5/24
[50] Field of Search ......................................... 33/1 SA,
204 C; 235/61 NV

[56] References Cited
UNITED STATES PATENTS

| 2,825,151 | 3/1958 | Hyams | 33/1.5 A UX |
| 3,243,897 | 4/1966 | West | 33/1.5 A |
| 3,350,549 | 10/1967 | Bredall | 33/1.5 A X |
| 3,456,350 | 7/1969 | Riblet et al. | 33/1.5 A |
| 3,493,665 | 2/1970 | Webb | 33/1.5 A X |

*Primary Examiner*—William D. Martin, Jr.
*Attorneys*—R. F. Kempf, E. Levy and G. T. McCoy ABSTRACT: An analog spatial maneuver computer provides an indication of three output angles through which a body in space must move so as to obtain a desired spatial attitude. These output angles are obtained by means of a plurality of gimbal rings arranged concentrically or connected by axles. The gimbals are selectively adjustable so that one of the rings indicates a first spatial attitude of the body and another of the rings is adapted to indicate the desired attitude of the body. The ring indicating the body's first spatial attitude is placed therein by selective adjustment of other rings among which are a third ring adjusted to represent a plane tangent to the earth at a known point; a fourth ring representing a spatial attitude of an earth support for the body prior to the time it is placed in space; and a fifth ring's attitude is adjusted to correspond to an inertial reference device located within the body. If desired, other selectively adjustable rings can be added to correct for drift of the inertial reference means.

ANALOG SPATIAL MANEUVER COMPUTER

ORIGIN OF THE INVENTION

The invention described herein was made by an employer of the U.S. Government and may be manufactured and used by or for the government for governmental purposes without the payment of any royalties thereon or therefor.

BACKGROUND OF THE INVENTION

It is frequently necessary to compute a series of angles through which bodies must move to take them from a known spatial attitude to a desired attitude in space. In the past, such angles were determined by either an electronic computer or interpolation between values of tables or "books." It is an object of this invention to provide a mechanical analog computer for indicating the correction maneuver angles (CMAs) through which such bodies must move in order to place them in the desired spatial attitudes.

As will be noted in connection with a preferred embodiment of the invention, particular problems arise where bodies such as rockets are launched into space from relatively remote locations where neither computers nor adequate tables are available. Hence, it is a further object of this invention to provide an analog spatial maneuver computer which is accurate and sufficiently small but sturdy enough to be transportable to remote locations.

Rocket vehicles are sometimes placed in space by means of "free flight." That is, they are placed in a known attitude at the time they are launched and they are fired into space without additional guidance. But these vehicles are equipped with attitude control mechanisms to control their attitude after they have obtained a suitable altitude such as that at which a rocket might be located after "burnout." These attitude control mechanisms are adapted to first reorient the body to the same spatial attitude at which it was launched and then move the body into a desired attitude so as to aim observation instruments which the rocket may carry toward a star, pulsar or other celestial object or area.

The launch attitude of such rockets, however, is usually not determinable until only minutes before they are actually launched. This is because the pitch and yaw values for the rocket's launch attitude are continually subject to change to compensate for variations in wind velocity and other variables in order to assure that the rocket will impact in a desired area. Moreover, in terms of a body's spatial attitude within the celestial sphere, a rocket's launch attitude is continually changing even though its geographic position on the earth remains relatively fixed. This is because the earth is continually spinning about its axis so that the spatial attitude of a given point on the earth is continually changing. Consequently, the computation of a rocket or other body's spatial launch attitude must include an accurate and up-to-date input of the actual launch time and of the rocket's attitude at launch. These, however, are usually not known until minutes before flight. Hence, it is another object of this invention to not only provide a portable mechanical analog spatial maneuver computer, but to provide such a device that can produce substantially instantaneous CMAs in order that they might be introduced into the rocket's attitude control mechanism prior to launch time.

SUMMARY OF THE INVENTION

Several different embodiments of analog spatial maneuver computers have been built in connection with various applications of the invention's broader aspects. One preferred embodiment, however, is more universal in nature because it accounts for additional variables which are not required in some of the invention's more fundamental embodiments. That particular preferred embodiment has been used in connection with determining CMAs for rockets having inertial reference attitude control systems and launched from gimbaled launch towers. And, in accordance with the principles of the invention as applied to that preferred embodiment, a frame functions as a first ring representing a great circle of the celestial sphere having the first target such as Spica, at its top. Another ring has a pointed element thereon which represents the rocket in its desired spatial attitude pointing to the first target—Spica. A third ring is selectively positionable to an attitude corresponding to the rocket's first "known" spatial attitude. That is, its launch attitude into which it is again placed after burnout and from which it must be moved so as to place it in its desired spatial attitude—pointing toward Spica. Suitable outputs also provide an indication of the angular differences between the rocket's first attitude and its desired position. In other words, these outputs indicate the necessary CMAs through which the rocket must move in order to be placed in its desired attitude.

A fourth ring of the preferred embodiment is selectively adjustable to represent a plane tangent to the earth at the launch point; a fifth ring is selectively adjustable to indicate the spatial attitude of the launch tower itself; and a sixth ring is selectively spatially adjustable to represent the rocket's inertial reference indicating means at the time of launch. Other rings are provided to compensate for drift of the inertial reference system between the time the rocket is launched and the time of burnout.

BRIEF DESCRIPTION OF THE DRAWINGS

The foregoing and other objects, features and advantages of this invention will be apparent from the following more particular description of a preferred embodiment thereof as illustrated in the accompanying drawings wherein the same reference numerals refer to the same parts throughout the various views. The drawings are not necessarily intended to be to scale, but rather are presented so as to illustrate the principles of the invention in clear form.

In the drawings.

DESCRIPTION OF A PREFERRED EMBODIMENT

Figure 1:
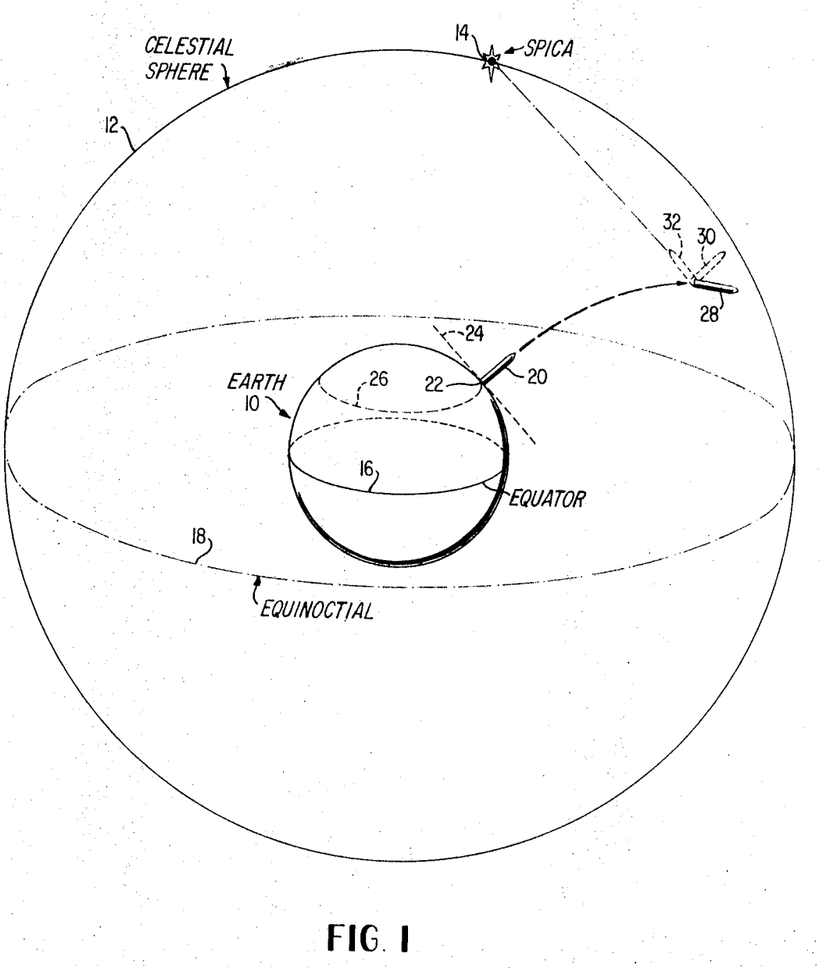
FIG. 1 is a schematic diagram of a rocket as it is fired into space and maneuvered so as to be brought into alignment with a target.

FIG. 1 depicts the earth 10 surrounded by a celestial sphere 12 which includes the star Spica 14. The earth's equator 16 is projected onto the celestial sphere 12 to form the equinoctial 18. A rocket 20 is located at a launch site 22 and an imaginary plane 24 is tangent to the earth's surface at the launch site 22 which is located at a given latitude 26 on the earth's surface.

The rocket 20 contains gyros (not shown) which, at the time of launch, are uncaged so that their axes represent the rocket's launch attitude. When the rocket is launched, it undergoes free flight until it reaches a burnout attitude 28. At burnout the rocket's gyros are sensed and gas jets (not shown) move the rocket into null alignment with the reference gyros which, by means of a servoloop, turn off the gas jets when the rocket is nulled at a position corresponding to its launch attitude 30. At this time, therefore, the rocket is in a known spatial attitude hereafter referred to as its post burnout attitude (PBA). The rocket's attitude control system then causes it to be moved by means of the gas jets through correction maneuver angles (CMAs) to result in the rocket being aligned in roll, pitch and yaw with its intended "first target" such as Spica, attitude 32, after which the rocket may be repointed to other targets by preprogrammed commands in its attitude control system. When the rocket is in attitude 32 and is aligned properly in roll, pitch and yaw to the first target, it is said to be in its first target attitude (FTA).

As previously noted the spatial attitude of the earth in the celestial sphere is continually changing as the earth rotates about its axis. Hence, the launch site 22 and the unlaunched rocket 20 are subjected to a continuous change of spatial attitude. Moreover, the rocket is not launched perpendicular to the earth's surface but is tilted as necessary to control its impact location under varying conditions of wind velocity and direction. The rocket is tilted by means of a bridgelike launch tower (not shown) through which the rocket is guided during launch. The launch tower itself is gimbal mounted in a base structure to provide for changes of the launch tower's attitude. In this manner the rocket is permitted to move about the axes within the base tower whereby the rocket's attitude may be continually changed right up to the time of launch to compensate for changes in wind velocity and the like. As will now be described in more detail the structure of the invention is adapted to account for all of these variables so that an input can be applied to the rocket's control system just prior to launch. At burnout attitude (28) the rocket can be moved into attitude 32 in alignment and roll orientation with the first target Spica after it is readjusted to its launch attitude 30.

Figure 2:
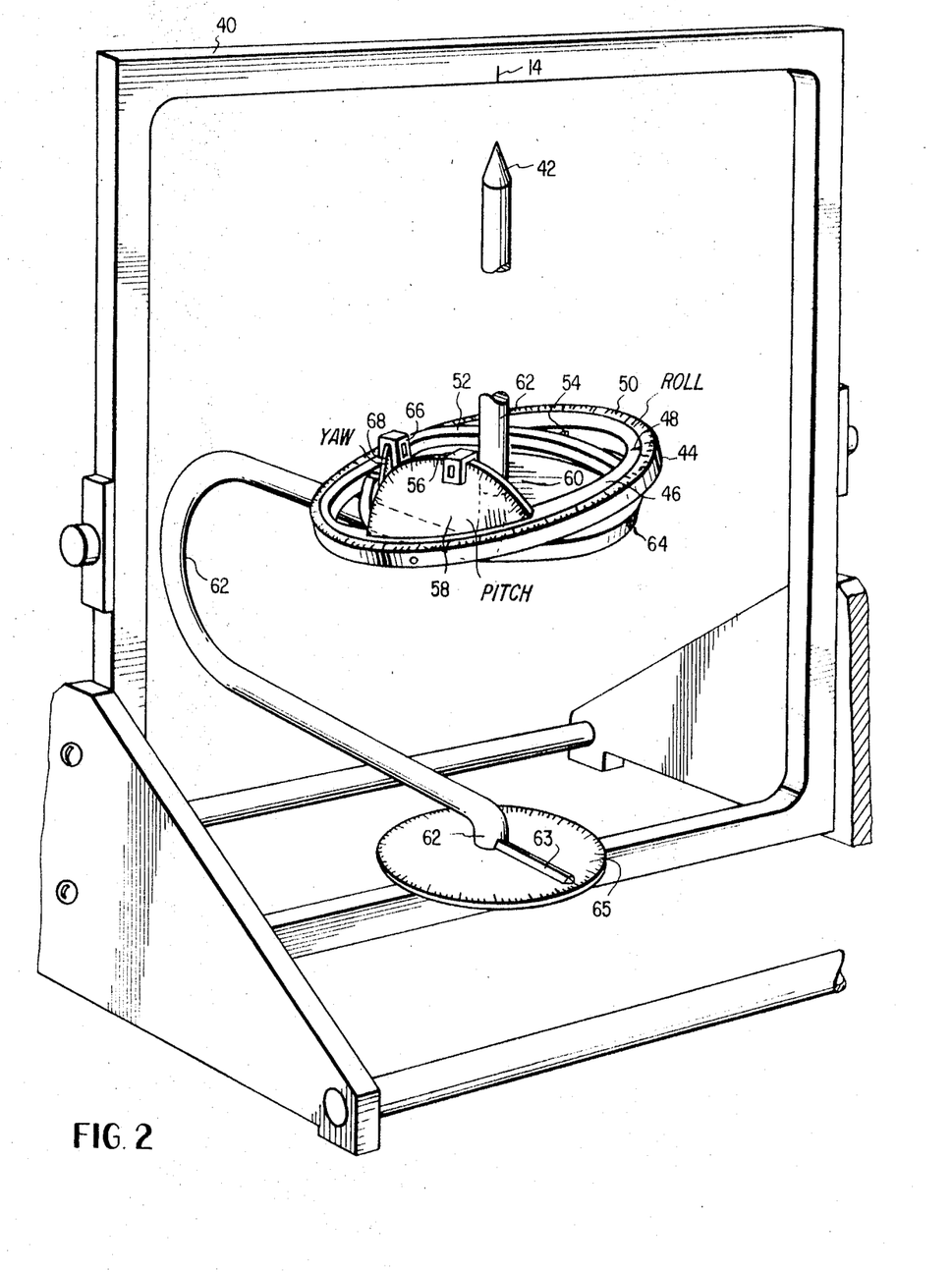
FIG. 2 is a schematic illustration of means on a preferred embodiment of an invention for indicating both the rocket's attitude to which it is adjusted after burnout; and its final desired attitude at which it is in alignment with the first target.
Figure 6:
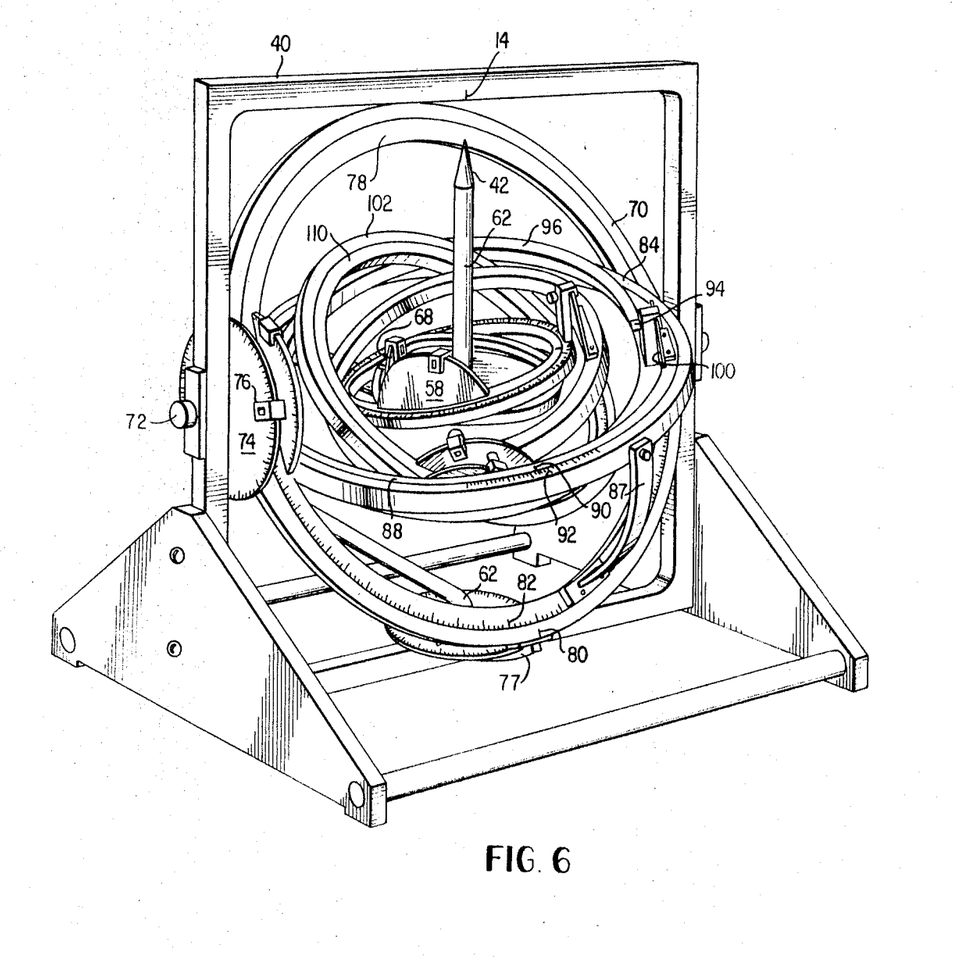
FIG. 6 is a pictorial schematic illustration of a preferred embodiment of the invention.

FIG. 2 represents a portion of the complete structure of the preferred embodiment illustrated in FIG. 6. In this respect, a frame 40 represents a great circle on the celestial sphere 12. The first target, Spica 14, is at the center of the top of the frame 40. A pointer 42 is broken away in FIG. 2 and represents the rocket in its desired attitude pointing toward the first target 14. The structure supporting pointer 42 will be described later in connection with ring 60.

A first gimbaled ring 44 is connected to the frame 40 by means adapted to selectively position the ring 44 in a plane corresponding to a cross section through the rocket at its moment of launch. The structure supporting the ring 44 will be described later in connection with FIGS. 3—5.

Ring 46 is concentrically mounted so as to be coplanar with ring 44 and rotatable within the outer ring 44. A scribe line 48 indicates the relative rotation of ring 46 with respect to a plurality of scribe lines 50 on ring 44. This relative rotation represents part of the computer's output indicating the roll angle component of the CMA's.

A ring 52 is mounted for pivotal motion with respect to ring 46 by means of axles 54 extending therebetween. An indicator 56 mounted on the ring 52 indicates the pitch angle component of the CMA's by pointing to a pitch indicator 58 mounted on ring 46.

An innermost ring 60 is affixed to a gooseneck shaped axle 62 which, in turn, is supported from frame 40 and mounted coaxially and in fixed roll alignment with the element 42 corresponding to the rocket. The gooseneck in axle 62 provides clearance for the various rings as they are moved about on different problems. An indicator arm 63 affixed to axle 62 reads the desired final FTA roll azimuth of the rocket by pointing to indicator 65 which is fixed to frame 40. In this respect, ring 60 is mounted in a plane perpendicular to the rocket element 42's axis and, therefore, represents a cross section through the rocket when it is in its FTA attitude 32. The ring 52 is mounted for pivotal motion with respect to the ring 60 by means of axles 64 extending therebetween and at 90° to axle 54. An indicator arm 66 on ring 60 designates the yaw angle component of the CMA by pointing to a given scribe line on a yaw indicator 68 mounted on the ring 52.

When the above described ring 44 is placed in its attitude corresponding to the rocket's PBA, the roll correction angle, the pitch correction angle, and the yaw correction angle comprise the output of the invention's computer. These correction angles for the embodiment shown here are presented in roll-pitch-yaw order, but they can be presented in a different order if desired.

Thus far, means have been described for indicating both a first spatial attitude of the rocket (its PBA indicated by ring 44) and the correction maneuver angles so that the rocket can be moved from its first spatial attitude to its desired spatial attitude (its FTA). Means will now be described for adjusting the ring 44 to compensate for the location of the launch site, the sidereal time of launch, and the astronomical declination and sidereal angle of the first target which, in this example, happens to be Spica.

Figure 3:
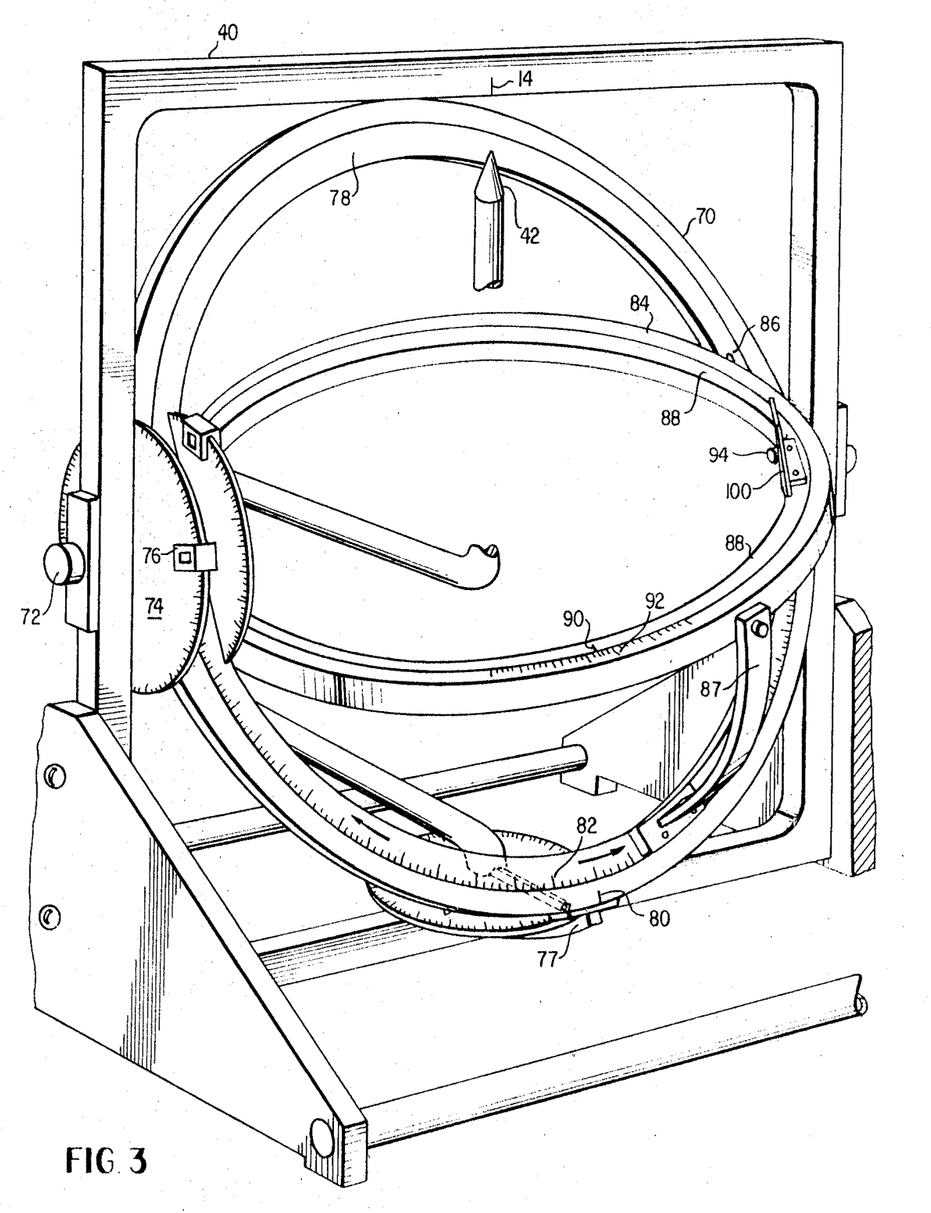
FIG. 3 is a schematic illustration of means on a preferred embodiment of the invention for indicating the spacial attitude of the base structure of the rocket's launch tower with respect to the first target.

It has been previously noted in connection with FIG. 2 that the frame 40 represents an outer ring designating a great circle on the celestial sphere and that the first target is located at point 14 on the frame 40. These are also illustrated in FIG. 3 where a ring 70 is mounted for pivotal motion with respect to the frame 40 by means of axles 72. The ring 70 represents the celestial sphere's equinoctial In this respect, the first target 14 is on a celestial meridian that is perpendicular to the frame 40. Hence, by definition, the great circle represented by the frame 40 intersects the equinoctial at two points (axles 72) each 90° from the intersection of the first target's celestial meridian and the equinoctial. The angle between the frame 40 and the ring 70 is determined by the declination of the first target. This angle is designated on an indicator 74 fixed to the frame 40 by a declination indicator arm 76 mounted on ring 70. The angle is adjusted by means of an adjustable sector element 77 (FIG. 6).

Ring 78 represents the earth's equator and is concentrically rotatably located within ring 70 to simulate rotation of the earth about its axis. That is, relative rotation between rings 70 and 78 represents local siderial time at the launch site as indicated by a scribe line 80 on ring 70 relative to sideral—time scribe lines 82 on ring 78.

Ring 84 is pivotally affixed to ring 78 by means of axles 86. The angle between ring 84 and ring 78 represents the colatitude of the launch site and is adjustable by means of a sector element 87 (FIG. 6). Hence, the plane of ring 84 corresponds to a plane tangent to the earth's surface at the launch tower.

It has been noted that many launch towers are constructed to be mounted on a launch tower base structure by means of a gimbal ring so that the rocket launch attitude may be freely adjusted in pitch and yaw. In such cases the mountings of the tower gimbal ring are aligned in some given azimuth direction. It is for this reason that ring 88 which represents the launch tower base structure is concentrically rotatably mounted within ring 84 so that relative rotation therebetween is indicated by the relative position of a scribe line 90 on ring 88 with respect to a plurality of scribe lines 92 on ring 84.

Figure 4:
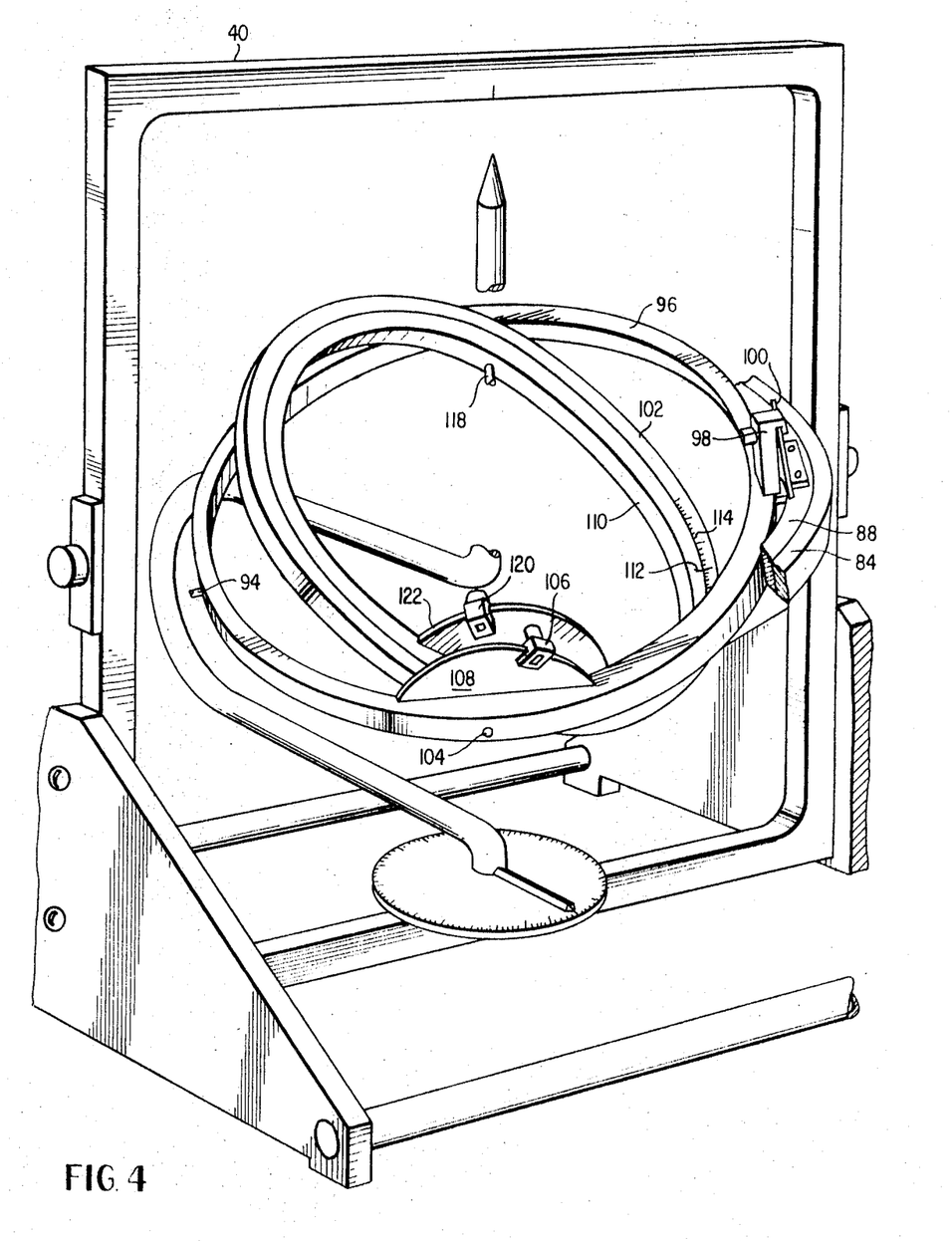
FIG. 4 is a schematic diagram of means on a preferred embodiment for indicating the launch attitude of the rocket, particularly as it relates to the launch tower's gimbal suspension mechanism.

Axles 94 serve to pivotally mount ring 96 which represents the launch tower gimbal ring within ring 88 as shown in FIG. 4. In this respect, the angle between ring 96 and ring 88 as indicated by the relative position of an indicator arm 98 on ring 96 with respect to an indicator 100 on ring 88, this angle corresponds to the launch pitch angle of the rocket with respect to a vertical to the earth's surface. Similarly, ring 102 which corresponds to a transverse section of the launch tower is mounted for pivotal motion with respect to ring 96 by means of axles 104 so that the angle between rings 96 and 102 represents the launch yaw angle of the rocket with respect to the launch tower gimbal ring. This launch yaw angle is designated by an indicator arm 106 on ring 102 with respect to a scribed indicator 108 on ring 96.

Figure 5:
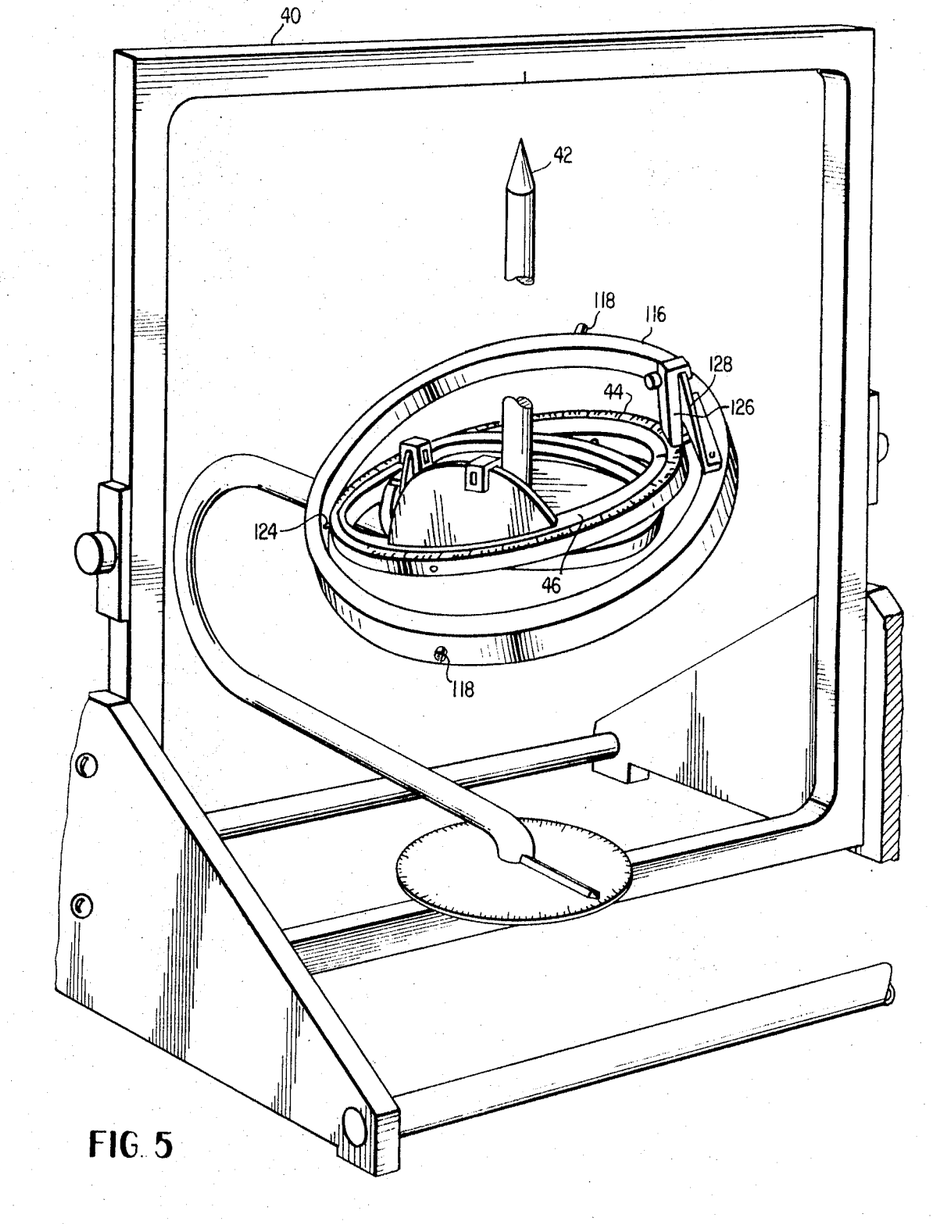
FIG. 5 is a schematic diagram of means on a preferred embodiment of the invention for indicating the launch attitude of the rocket's inertial reference system as it is corrected for expected drift during the rocket's powered flight.

Ring 110 is concentrically rotatably mounted within ring 102 and relative movement therebetween is designated by the relative position of a scribe line 112 on ring 110 with respect to scribe lines 114 on ring 102. The relative rotation between these rings represents the roll angle differential between the azimuth of the launch tower and the outer gimbal azimuths of the rocket's inertial reference system where such system is employed. Also, in cases where it is anticipated that the inertial reference system will undergo roll-angle drift during powered flight, compensation therefor can be entered into the computer by moving ring 112 within ring 102 by an amount corresponding to such roll angle drift.

Where attitude control systems are expected to undergo pitch and yaw angle drift between launch time and the time the rocket undergoes its correction maneuver angles, compensation for such drift can be entered by adjustment of rings 116 and 44 as illustrated in FIG. 5. Therein, ring 116 is shown to be mounted on axles 118 for pivotal motion with respect to ring 110. The degree of tilt between the two rings is indicated by indicator arm 120 on ring 116 with respect to scribe lines on indicator 122 mounted on ring 110. This tilt is adjusted to correspond to the anticipated pitch drift of the rocket's inertial reference system. Ring 44, which, as noted, represents a cross section of the rocket in its post burn out attitude is pivotally mounted within ring 116 on axles 128; and the angle between ring 44 and ring 116 is indicated by the position of indicator arm 126 on ring 44 with respect to scribe lines on indicator 128 on ring 116 so as to designate the expected yaw drift of the rocket's inertial reference system during powered flight.

In operation, the first target is selected and the ring 70 is adjusted by its sector element so that the angle indicated by indicator arm 76 corresponds to the declination of the first target. Next, ring 84 is adjusted by its sector so that ring 84's angle with respect to the launch rings 70 and 78 correspond to the colatitude of the launch site and ring 84 defines a plane that is tangent to the earth's surface at the point of launch.

Ring 88 is then adjusted by rotation within ring 84 so that its scribe line 90 corresponds to the azimuth orientation of the launch tower base structure itself and ring 110 is adjusted so that its scribe line 112 indicates the azimuth orientation of the rocket's inertial reference system. Next, the anticipated roll, pitch, and yaw drift angles of the rocket's inertial reference system are entered into the computer by suitable adjustment of rings 110, 116, and 44 respectively. Finally the desired roll orientation for the FTA is set by adjusting indicator arm 63 with respect to indicator 65. At this time, the illustrated embodiment of the invention's computer has received all of its inputs except those which cannot be determined until only minutes prior to launch. These last minute inputs are: the time of launch, the pitch of the rocket and launch tower relative to the vertical, and yaw of the rocket and launch tower relative to the tower gimbal ring.

As soon as the launch time is know, it is entered into the computer by movement of ring 78 within ring 70 so that the scribe line 80 is opposite the local sidereal time of launch. Similarly, the rocket's launch-pitch and launch-yaw angles are entered into the computer by adjustment of rings 96 and 102 so that their indicator arms 98 and 106 designate the proper angles on indicators 100 and 108 respectively. After all of the computer inputs are entered the correction maneuver angle (CMA) outputs are read on the roll, pitch, and yaw outputs indicators 50, 58 and 68 respectively. They are then entered into the rocket's post-burnout attitude control mechanism so that the rocket will be moved through the proper CMA after it is placed into its PBA following burnout.

It will be appreciated that the above described structure provides an analog computer that is both accurate and portable while still being admirably suitable for determining substantially instantaneous correction maneuver angles through which a body in space must be moved to obtain a subsequently desired spatial attitude (FTA). Hence, the structure of the invention permits such bodies as rockets to be launched from remote locations without the previously required launch assistance of either complex computers or impractical stacks upon stacks of tables which produce neither expedient nor accurate results.

It will also be appreciated by those skilled in the art that some of the above described adjustable rings are not necessary for all uses of the invention. In fact, even where the invention is used in connection with rockets launched from remote locations some of the rings might be eliminated. For example, if a boom type of launcher is used, instead of a gimbal mounted launch tower, the rings 88 and 96 can be adjusted so that their indicators correspond to the boom's train and elevation motions; and ring 102 is merely fixed with respect to ring 96. In other words, where boom-type launchers are used, it is only necessary to provide train and elevation inputs to the computer rather than inputs corresponding to the launch tower base structure's azimuth and the rocket launch tower's pitch and yaw angles.

While the invention has been particularly shown and described with reference to a preferred embodiment thereof, it will be understood by those skilled in the art that various changes in form and details may be made therein without departing from the spirit and scope of the invention. For example, although ring 84 was described as being adjustably positioned by sector 87 it will be apparent that where the computer is intended for continued use at a given launch site the latitude of the site remains fixed so that this aspect of ring 84's attitude can also remain fixed. Another variation is the rearrangement of the roll-pitch-yaw output angles to another order such as pitch-yaw-roll, or to an arrangement with two roll read outs and one pitch readout to compute the frequently used roll-pitch-roll situation.

What I claim is:

1. An analog spatial maneuver computer for determining maneuver angles through which a body in the celestial sphere must move to get from a known spatial attitude to a desired attitude comprising:
   selectively positionable means for representing a cross section of said body;
   positioning means for selectively positioning said positionable means in a first known spatial attitude corresponding to a first spatial attitude of said body in said celestial sphere;
   first indicating means in operative connection with said positionable means for indicating the known spatial attitude of said body in the celestial sphere;
   second indicating means movable with respect to said positionable means for indicating the desired spatial attitude of said body in said celestial sphere; and,
   means responsive to said first and second indicating means for indicating the correction maneuver angles through which said body must be moved to place said body in said desired attitude in said celestial sphere.

2. The apparatus of claim 1, wherein said correction maneuver angle indicating means includes means for indicating the roll, pitch and yaw angles through which said body must be moved to place said body in said desired spatial attitude in said celestial sphere.

3. The apparatus of claim 1, including second selectively positionable means for representing a plane tangent to the earth at a known point; and,
   second positioning means for selectively positioning said plane indicating means in an attitude corresponding to the spatial location of said plane.

4. The apparatus of claim 3, including third selectively positionable means for indicating the spatial attitude of an earth support for said body; and,
   third positioning means for positioning said earth support indicator in an attitude corresponding to the spatial attitude thereof.

5. The apparatus of claim 1, including third selectively positionable means for indicating the spatial attitude of an earth support for said body; and,
   third positioning means for positioning said earth support indicator in an attitude corresponding to the spatial attitude thereof.

6. The apparatus of claim 1, wherein said body includes an inertial reference system, said apparatus including:

fourth selectively positionable means for indicating the spatial attitude of said inertial reference system at a first point in time; and, means for placing said inertial reference indicating means in a spatial attitude corresponding to said attitude of said inertial reference at said first point in time.

7. The apparatus of claim 6, including means for changing the spatial attitude of said inertial reference indicating means to correct for drift of said inertial reference system between said first point in time and a second point in time.

8. The apparatus of claim 7, wherein said correcting means includes means for correcting for the roll, pitch and yaw of said inertial reference system between said first point in time and said second point in time.

9. An analog spatial maneuver computer for determining maneuver angles through which a body in space must move to get from a known spatial attitude to a desired attitude in space comprising:

a first ring representing a great circle on the celestial sphere passing through a first target;

a second ring pivotally connected within said first ring so that the angle therebetween is adjustable to correspond to the astronomical declination of said first target;

a third ring concentrically rotatably mounted within said second ring so that relative rotation therebetween corresponds to the local siderial time at a given point on the earth;

a fourth ring pivotally adjustably mounted within said third ring so that the plane of said fourth ring corresponds to a plane tangent to the earth's surface at said given point on the earth;

a fifth ring located within said fourth ring and adjustably connected thereto in a spatial attitude corresponding to the spatial attitude of a cross section of said body at a first point in time; and, means located within said fifth ring and connected thereto so as to be positioned by said fifth ring for indicating the correction maneuver angles through which said body must move to change its attitude at a second point in time from an attitude corresponding to said attitude at said first point in time to a desired attitude so that said body is brought into alignment with said first target.

10. The apparatus of claim 9, wherein said body is gimbal mounted at said given point on the earth at said first point in time including:

a sixth ring concentrically rotatably mounted within said fourth ring so that relative rotation between said sixth ring and said fourth ring corresponds to the azimuth direction of said gimbal mountings; and a seventh ring pivotally connected within said sixth ring so that the angle between said seventh and sixth rings corresponds to the pitch of said body at said first point in time; and an eighth ring pivotally mounted within said seventh ring so that the angle therebetween corresponds to the yaw angle of said body at said first point in time.

11. The apparatus of claim 10, wherein said body includes an inertial reference system, said apparatus including a ninth ring concentrically rotatably located within said eighth ring so that relative motion therebetween corresponds to the azimuth orientation of said inertial reference system with respect to said azimuth location of said support structure gimbals.

12. The apparatus of claim 11, wherein said ninth ring is further adapted to compensate for roll, drift of said inertial reference system occuring between said first point in time and a second point in time; and a tenth ring mounted within said ninth ring so that the angle therebetween corresponds to the pitch angle drift of said inertial reference system between said first point in time and said second point in time; and said fifth ring pivotably mounted within said tenth ring so that the angle therebetween corresponds to the yaw angle drift of said inertial reference system between said first point in time and said second point in time.